US006430401B1

(12) United States Patent
Lou et al.

(10) Patent No.: US 6,430,401 B1
(45) Date of Patent: Aug. 6, 2002

(54) TECHNIQUE FOR EFFECTIVELY COMMUNICATING MULTIPLE DIGITAL REPRESENTATIONS OF A SIGNAL

(75) Inventors: Hui-Ling Lou, Murray Hill; Deepen Sinha; Carl-Erik Wilhelm Sundberg, both of Chatham, all of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/280,280

(22) Filed: Mar. 29, 1999

(51) Int. Cl.[7] .................................................. H04B 1/02

(52) U.S. Cl. ......................... 455/108; 455/109; 455/63; 375/270; 375/346; 375/260

(58) Field of Search ................................ 455/108, 109, 455/309, 296, 277.2, 501, 63, 47; 375/270, 308, 298, 130, 346, 260, 267, 347, 349, 299

(56) References Cited

U.S. PATENT DOCUMENTS

| | | | | | |
|---|---|---|---|---|---|
| 5,680,418 | A | * | 10/1997 | Croft et al. | 376/346 |
| 5,887,020 | A | * | 3/1999 | Smith et al. | 375/130 |
| 5,956,373 | A | * | 9/1999 | Goldston et al. | 375/298 |
| 6,005,894 | A | * | 12/1999 | Kumar | 375/270 |
| 6,108,810 | A | * | 8/2000 | Kroeger et al. | 714/790 |
| 6,178,317 | B1 | * | 1/2001 | Kroeger et al. | 455/296 |

OTHER PUBLICATIONS

V. Vaishampayan, "Design of Multiple Description Scalar Quantizers," *IEEE Transactions of Information Theory,* vol. 39, No. 3, May 1993, pp. 821–834.

J. Conway et al., "Voronoi Regions of Lattices, Second Moments of Polytopes, and Quantization," *IEEE Transactions on Information Theory,* vol. IT–28, No. 2, Mar. 1982, pp. 211–226.

M. Eyuboglu et al., "Lattice and Trellis Quantization with Lattice–and Trellis–Bounded Codebooks—High–Rate Theory for Memoryless Sources," *IEEE Transactions on Information Theory,* vol. 39, No. 1, Jan. 1993, pp. 46–59.

* cited by examiner

*Primary Examiner*—Dwayne Bost
*Assistant Examiner*—Lewis West
(74) *Attorney, Agent, or Firm*—Ryan, Mason & Lewis, LLP

(57) ABSTRACT

In a communications system implementing, e.g., an in-band on channel AM (IBOC-AM) (also known as "hybrid IBOC-AM") scheme, multiple bit streams are used to represent an audio signal to be transmitted over one or more frequency bands including, e.g., parts of an AM frequency band for radio broadcast. These bit streams contain various and/or equivalent amounts of audio information. In an illustrative embodiment, at least one of the bit streams is a core bit stream containing core audio information. The remaining bit streams are enhancement bit streams containing enhancement audio information. The core bit stream is necessary for recovering the audio signal with minimal acceptable quality. Such quality is enhanced when the core bit stream, together with one or more of the enhancement bit streams, is used to recover the audio signal. In accordance with the invention, the AM frequency band is divided into subbands. Each of the core and enhancement bit streams is assigned to a respective one of the subbands for transmission. The assignment is conducive to an effective treatment of interference affecting the IBOC-AM system. Other embodiments may include, e.g., communications of the multiple bit streams in accordance with the invention in an IBOC-FM system, a satellite broadcasting system, etc.

61 Claims, 7 Drawing Sheets

201

TECHNIQUE FOR EFFECTIVELY COMMUNICATING MULTIPLE DIGITAL REPRESENTATIONS OF A SIGNAL

FIELD OF THE INVENTION

The invention relates to systems and methods for communications of digitally modulated signals, and more particularly to systems and methods utilizing multiple bands including,. e.g., parts of an amplitude-modulation (AM) frequency band, to communicate digitally modulated signals.

BACKGROUND OF THE INVENTION

The explosive growth of digital communications technology has resulted in an ever-increasing demand for bandwidth for communicating digital audio information, video information and/or data.

For example, to efficiently utilize bandwidth to communicate digital audio information, a perceptual audio coding (PAC) technique has been developed. For details on the PAC technique, one may refer to U.S. Pat. No. 5,285,498 issued Feb. 8, 1994 to Johnston; and U.S. Pat. No. 5,040,217 issued Aug. 13, 1991 to Brandenburg et al., both of which are hereby incorporated by reference. In accordance with such a PAC technique, each of a succession of time domain blocks of an audio signal representing audio information is coded in the frequency domain. Specifically, the frequency domain representation of each block is divided into coder bands, each of which is individually coded, based on psycho-acoustic criteria, in such a way that the audio information is significantly compressed, thereby requiring a smaller number of bits to represent the audio information than would be the case if the audio information were represented in a more simplistic digital format, such as the PCM format.

Recently, the industry turned its focus to the idea of utilizing the preexisting analog AM frequency band more efficiently to accommodate digital communications as well. However, it is required that any adjustment to the AM band to provide the additional capacity for digital communications does not significantly affect the analog AM signals currently generated by radio stations on the same band for AM radio broadcast. In the United States, adjacent geographic areas covered by AM radio broadcast are assigned different AM carrier frequencies, which are at least 20 kHz apart. Specifically, when they are exactly 20 kHz apart, the AM carrier assigned to the adjacent area is referred to as a "second adjacent carrier." Similarly, when they are 10 kHz apart, the AM carrier assigned to the adjacent area is referred to as a "first adjacent carrier."

An in-band on channel AM (IBOC-AM) (also known as "hybrid IBOC-AM") scheme utilizing bandwidth of the AM band to communicate digital audio information has been proposed. In accordance with the proposed scheme, digitally modulated signals representing the audio information populate, e.g., a 30 kHz digital band centered at an analog host AM carrier. The power levels of the spectrums of the digitally modulated signals are allowed to be equally high across a 10 kHz subband in the digital band on each end thereof.

However, in implementation, it is likely that two such IBOC-AM schemes would be respectively employed in two adjacent areas, to which the host AM carriers assigned are 20 kHz apart. In that case, the 30 kHz digital bands for digital communications centered at the respective host AM carriers overlap each other by 10 kHz, thereby causing undesirable "adjacent channel interference" to each area. In particular, such interference is referred to as "second adjacent channel interference," as the dominant interfering carrier in this instance consists of a second adjacent carrier. For example, the second adjacent channel interference degrades the digital communications in each of the adjacent areas, especially in the parts of the areas which are close to their common border.

Accordingly, there exists a need for a technique, e.g., based on the PAC technique, for effectively utilizing the AM band for digital communications and treating adjacent channel interference in adjacent areas where IBOC-AM schemes are employed.

SUMMARY OF THE INVENTION

In accordance with the invention, in communicating a signal over multiple frequency bands including, e.g., in parts of the AM frequency band, multistream coding is implemented, whereby multiple digital representations each containing information descriptive of the signal are generated. The information contained in at least one of the representations is different than that contained in every other representation. In an illustrative embodiment, at least one of the representations (referred to as a "core representation") contains core information, and the remaining non-core representations (referred to as "enhancement representations") contain enhancement information. The core information is more generally descriptive of the signal than the enhancement information. Each representation is transmitted through the frequency band assigned thereto, thereby realizing multistream transmission.

The aforementioned signal may be recovered using all of the digital representations or a subset thereof if some of the frequency bands are severely affected by, e.g., the first or second adjacent channel interference caused by the first or second adjacent channel carrier described above in the case of the IBOC-AM system. The quality of the recovered signal varies with the actual representations used. The signal recovered using only the core representation has the minimal acceptable digital quality. The signal recovered using the enhancement representations, in addition to the core representation, has relatively high quality. In the latter case, the more enhancement representations are used, the higher the quality. However, without the core representation, no signal of acceptable digital quality can be recovered.

Thus, in accordance with an aspect of the invention, the frequency band which is the least susceptible to the interference is assigned to the core representation for transmission to improve the chance of recovery of a signal having at least acceptable digital quality. Advantageously, for example, relative to the prior art IBOC-AM system, an IBOC-AM system implementing the multistream transmission scheme described above affords increased robustness against adverse channel conditions, and more graceful degradation of digital communications when such conditions occur.

DETAILED DESCRIPTION

Figure 1:
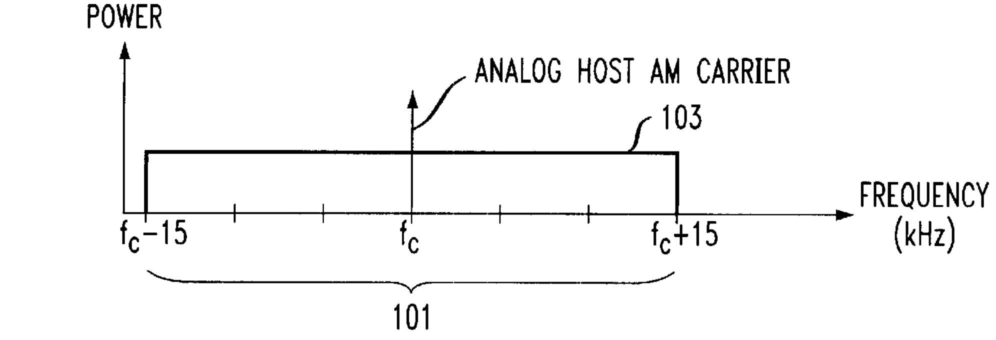
FIG. 1 PRIOR ART
FIG. 1 illustrates a prior art power profile of digitally modulated signals transmitted over an AM frequency band.

The invention is directed to a technique for digital communications over multiple frequency bands including, e.g., parts of an amplitude-modulation (AM) frequency band which is currently used by radio stations for AM radio broadcast. Referring to FIG. 1, in a prior art in-band on channel AM (IBOC-AM)(also known as "hybrid IBOC-AM") scheme which has been proposed, digitally modulated signals representative of digital audio information populate digital band 101 which is 30 kHz wide, and centered at an analog host AM carrier having a frequency $f_c$ for radio broadcast. An analog AM signal containing the radio broadcast, although not shown in FIG. 1, occupies a subband ranging from $f_c$–5 kHz to $f_c$–5 kHz. A multicarrier modem is used to transmit the digitally modulated signals, with uniform transmission power allocated thereto, resulting in power profile 103 of the signal spectrums which is uniform across digital band 101 and symmetric about $f_c$. For example, the digital transmission by the multicarrier modem may be in accordance with an orthogonal frequency division multiplexed (OFDM) (also known as a "discrete multitone") scheme.

However, we have recognized that use of the proposed IBOC-AM scheme in two adjacent areas, to which host AM carriers respectively assigned are 20 kHz apart, which is likely, causes significant "second adjacent channel interference." Such interference undesirably degrades the digital communications in each of the adjacent areas, especially in the parts of the areas close to their common border.

Figure 2:
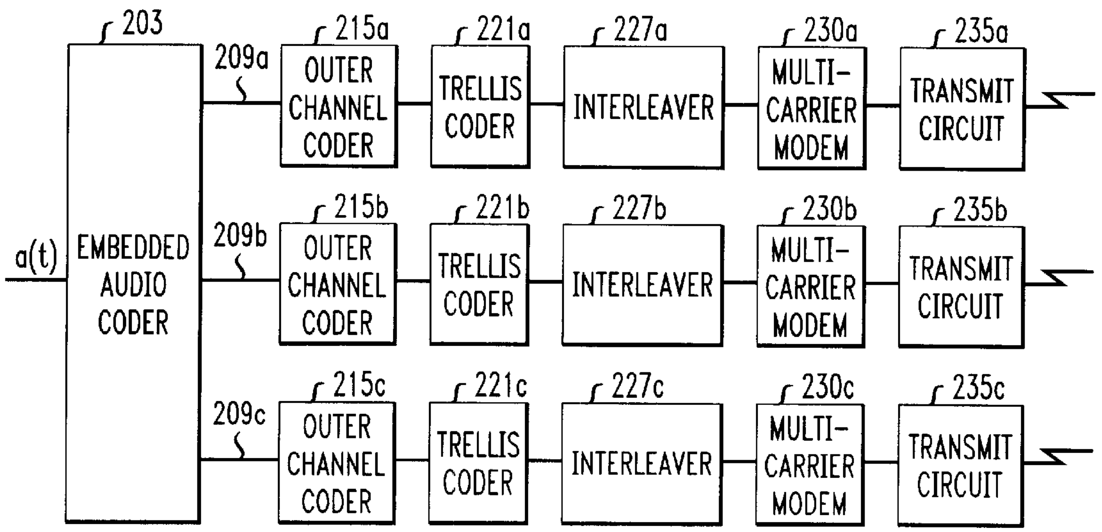
FIG. 2 is a block diagram of a transmitter for transmitting multiple bit streams containing audio information through subbands of an AM frequency band in accordance with the invention.

FIG. 2 illustrates transmitter 201 in an IBOC-AM communications system embodying the principles of the invention. The system is used to effectively communicate digitally modulated signals representing, e.g., audio information, over an AM frequency band in a geographic area which is assigned an analog host AM carrier whose frequency is $f_c$, despite any adjacent channel interference affecting the digitally modulated signals.

To effectively utilize digital band 101 to communicate the audio information and treat any adjacent channel interference, in particular, second adjacent channel interference, in accordance with the invention, multistream coding is implemented in the IBOC-AM system to generate multiple bit streams representing an audio signal containing the audio information, and the bit streams are respectively transmitted through individual subbands within digital band 101. The audio signal may be recovered using all of the bit streams received or a subset thereof if some of the subbands are severely affected by the adjacent channel interference and/or other adverse channel conditions. The audio quality, e.g., based on a signal-to-noise ratio (SNR) or preferably perceptually based measure, of the recovered signal varies with the underlying, received bit streams used. In general, the more received bit streams are used, the higher the audio quality of the recovered signal. Advantageously, with respect to the prior art proposed system, the inventive system affords increased robustness against adverse channel conditions, and more graceful degradation of digital communications when such conditions occur.

For example, in this illustrative embodiment, three bit streams are used to communicate an audio signal containing audio information in accordance with the invention, one of the bit streams represents core audio information and is referred to as a "C-stream." The other two bit streams represent first and second enhancement audio information, and are referred to as "$E_1$-stream" and "$E_2$-stream," respectively. Because of the design of the multistream coding described below, the audio signal recovered based on the C-stream alone, although viable, has the minimum acceptable quality; the audio signal recovered based on the C-stream in combination with either $E_1$-stream or $E_2$-stream has relatively high quality; the audio signal recovered based on the C-stream in combination with both $E_1$-stream and $E_2$-stream has the highest quality. However, any audio signal recovered based only on the $E_1$-stream and/or $E_2$-stream is not viable.

Figure 3:
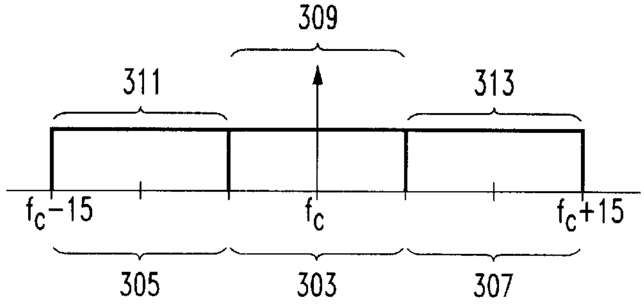
FIG. 3 illustrates a power profile of digitally modulated signals representing the multiple bit streams transmitted over the respective subbands.

Thus, in accordance with an aspect of the invention, the C-stream representing the minimal core audio information is transmitted through subband 303 in FIG. 3 between $f_c$–5 kHz and $f_c$–+5 kHz which is immune to second adjacent channel interference; the $E_1$-stream representing first enhancement audio information is transmitted through subband 305 between $f_c$–15 kHz and $f_c$–5 kHz which is subject to second adjacent channel interference; and the $E_2$-stream representing second enhancement audio information is transmitted through subband 307 between $f_c$+5 kHz and $f_c$+15 kHz which is also subject to second adjacent channel interference. As such, the minimal core audio information would be recoverable despite any second adjacent channel interference, and enhanced by any of $E_1$-stream and $E_2$-stream depending on whether the respective subbands 305 and 307 are severely affected by the second adjacent channel interference.

Referring back to FIG. 2, an analog audio signal a(t) containing audio information to be transmitted by transmitter 201 is fed to embedded audio coder 203 which is fully described below. It suffices to know for now that coder 203 based on the multistream coding generates the aforementioned C-stream, $E_1$-stream and $E_2$-stream representing the analog signal on leads 209*a*, 209*b* and 209*c*, respectively. The bit rates for the C-stream, $E_1$-stream and $E_2$-stream, thus generated, are M kb/sec, S1 kb/sec and S2 kb/sec., respectively. For example, if coder 203 is a 48 kb/sec audio coder, M, S1 and S2 in that case may be set to be 16, 16 and 16, respectively. These bit rates are selected such that if all of the streams are successfully received, the quality of the resulting recovered signal is close to that of a single stream generated by a conventional non-embedded audio coder at M+S1+S2 kb/sec. Similarly, the quality of the resulting signal recovered based on a combination of the C-stream with the $E_1$-stream or $E_2$-stream is close to that of a single stream generated by the conventional non-embedded audio coder at M+S1 kb/sec or M+S2 kb/sec. In addition, the resulting quality corresponding to the combination of the C-stream with the $E_1$-stream or $E_2$-stream is significantly higher than the analog AM quality.

The C-stream on lead 209*a*, $E_1$-stream on lead 209*b* and $E_2$-stream on lead 209*c* are fed to outer channel coder 215*a*, outer channel coder 215*b* and outer channel coder 215*c*, respectively. Outer channel coder 215*a* encodes the C-stream according to a well known forward error correction coding technique, e.g., the Reed Solomon coding technique in this instance, or alternatively a cyclic redundancy check (CRC) binary block coding technique, to afford correction and/or detection of errors in the C-stream after its transmission. The C-stream is processed by coder 215*a* on a block by block basis, with each block having a predetermined number of bits. In a conventional manner, coder 215*a* appends the Reed Solomon check symbols resulting from the encoding to each corresponding block. Similarly, coders 215*b* and 215*c* respectively processes the $E_1$-stream and $E_2$-stream on a block by block basis, and append Reed Solomon check symbols to each corresponding block of the streams for error correction and/or detection purposes.

The Reed Solomon coded C-stream, Reed Solomon coded $E_1$-stream and Reed Solomon coded $E_2$-stream are fed to trellis coders 221*a*, 221*b* and 221*c*, respectively. Trellis coder 221*a* processes the received Reed Solomon coded C-stream on a symbol (different from a Reed Solomon check symbol) interval by symbol interval basis, where the symbol interval has a predetermined duration $T_1$.

In a well known manner, coder 221*a* encodes the received bit stream in accordance with a trellis code to provide the communications system with a so-called "coding gain" which manifests itself in the form of enhance immunity to such random channel impairments as additive noise, without sacrificing the source bit rate or additional broadcast bandwidth. Specifically, coder 221*a* introduces redundancy into the received bit stream in accordance with the trellis code to allow use of a maximum likelihood decoding technique at receiver 503 in FIG. 5 to be described. This redundancy takes the form of one or more additional bits. During each symbol interval, coder 221*a* forms an encoded word, which includes redundancy bits and bits from the received Reed Solomon coded C-stream and is used to select a symbol from a signal constellation of conventional design. The selected symbols from coder 221*a* are interleaved by interleaver 227*a* to pseudo-randomize the symbols. During each time frame which is $K_1T_1$ long, multicarrier modem 230*a* processes $K_1$ symbols from interleaver 227*a* in accordance with the well known OFDM scheme, where $K_1$ is a predetermined number. In a well known manner, modem 230*a* generates $K_1$ pulse shaping carriers or digitally modulated signals corresponding to the $K_1$ symbols. The resulting pulse shaping carriers are transmitted by transmit circuit 235*a* through subband 303 with power profile 309. Transmit circuit 235*a* may include, e.g., a radio-frequency (RF) up-converter, a power amplifier and an antenna, all of conventional design.

Similarly, during each symbol interval $T_2$, trellis coder 221*b* forms an encoded word, which includes redundancy bits and bits from the received Reed Solomon coded $E_1$-stream and is used to select a symbol from a second predetermined signal constellation, where $T_2$ represents a predetermined duration. The resulting sequence of selected symbols are interleaved by interleaver 227*b* to pseudo-randomize the symbols. During each time frame which is $K_2T_2$ long, multicarrier modem 230*b* processes $K_2$ symbols from interleaver 227*b* in accordance with the well known OFDM scheme, where $K_2$ is a predetermined number. In a well known manner, modem 230*b* generates $K_2$ pulse shaping carriers or digitally modulated signals corresponding to the $K_2$ symbols. The resulting pulse shaping carriers are transmitted by transmit circuit 235*b* through subband 305 with power profile 311.

In addition, during each symbol interval $T_3$, trellis coder 221*c* similarly forms an encoded word, which includes redundancy bits and bits from the received Reed Solomon coded $E_2$-stream and is used to select a symbol from a third predetermined signal constellation, where $T_3$ represents a predetermined duration. The resulting sequence of selected symbols are interleaved by interleaver 227*c* to pseudo-randomize the symbols. During each time frame which is $K_3T_3$ long, multicarrier modem 230*c* transmits $K_3$ symbols from interleaver 227*c* in accordance with the well known OFDM scheme, where $K_3$ is a predetermined number. In a well known manner, modem 230*c* generates $K_3$ pulse shaping carriers or digitally modulated signals corresponding to the $K_3$ symbols. The resulting pulse shaping carriers are transmitted by transmit circuit 235*c* through subband 307 with power profile 313. If the $E_1$-stream and $E_2$-stream are equivalent and S1=S2, which is the case in this instance, $T_2=T_3$ and $K_2=K_3$.

Figure 4A:
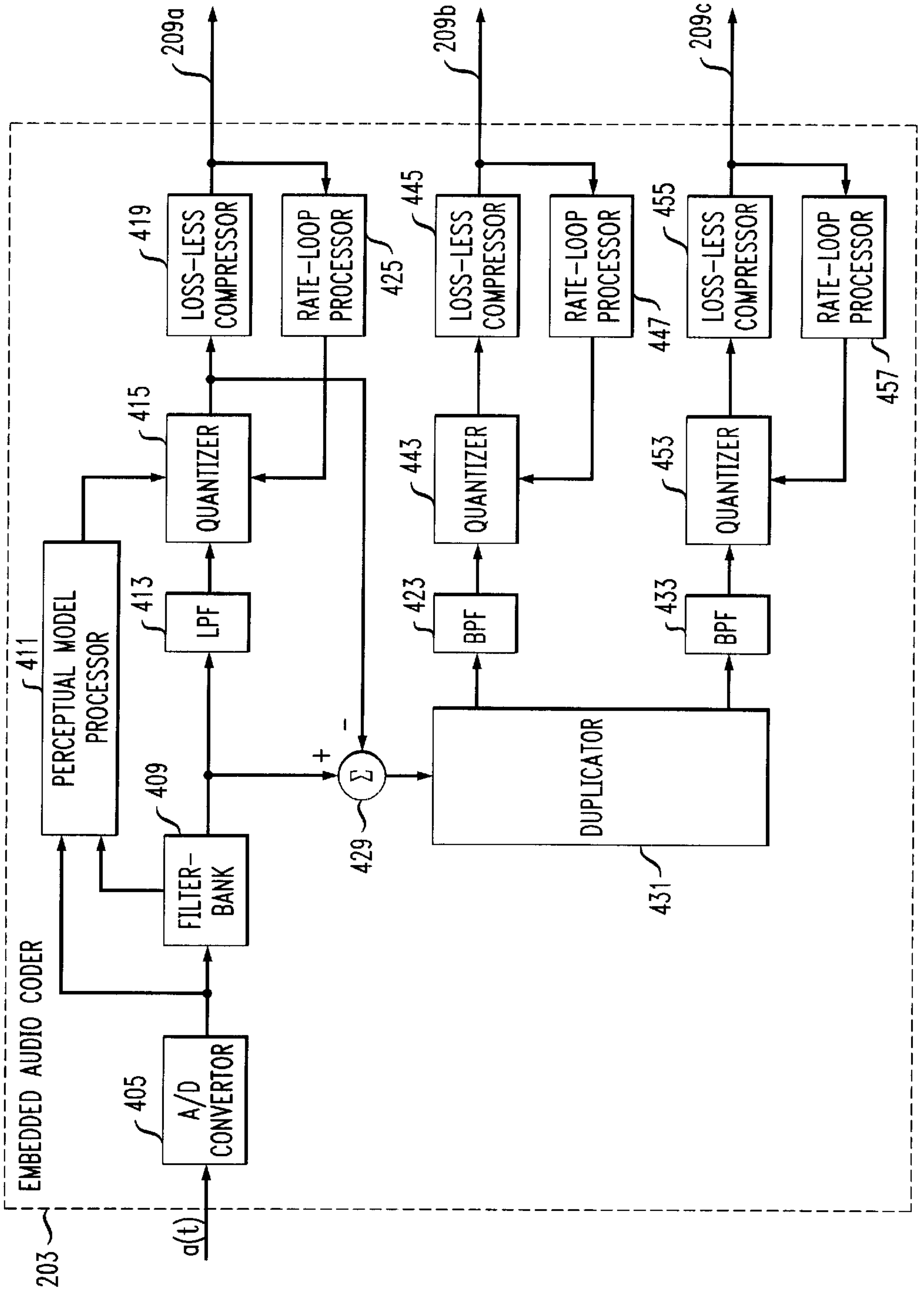
FIG. 4A is a block diagram of an embedded audio coder generating the multiple bit streams.

Embedded audio coder 203 performing the aforementioned multistream coding on the input audio signal a(t) will now be described. Referring to FIG. 4A, in response to a(t), analog-to-digital (A/D) convertor 405 in coder 203 digitizes a(t) in a conventional manner, providing PCM samples of a(t). These PCM samples are fed to both filterbank 409 and perceptual model processor 411. Filterbank 409. divides the samples into time domain blocks, and performs a modified discrete cosine transform (MDCT) on each block to provide a frequency domain representation therefor. Such a frequency domain representation is bandlimited by low-pass filter (LPF) 413 to the 0 to 6 kHz frequency range in this instance. The resulting MDCT coefficients are grouped by quantizer 415 according to coder bands for quantization. These coder bands approximate the well known critical bands of the human auditory system, although limited to the 0 to 6 kHz frequency range in this instance. Quantizer 415 quantizes the MDCT coefficients corresponding to a given coder band with the same quantizer stepsize.

Perceptual model processor 411 analyzes the audio signal samples and determines the appropriate level of quantization (i.e., stepsize) for each coder band. This level of quantization is determined based on an assessment of how well the audio signal in a given coder band masks noise. Quantizer 415 generates quantized MDCT coefficients for application to loss-less compressor 419, which in this instance performs a conventional Huffman compression process on the quantized coefficients, resulting in the aforementioned C-stream on lead 209*a*. The output of compressor 419 is fed back to quantizer 415 through rate-loop processor 425. In a conventional manner, the latter adjusts the output of quantizer 415 to ensure that the bit rate of the C-stream is maintained at its target rate, which in this instance is M kb/sec.

In this illustrative embodiment, the $E_1$-stream and $E_2$-stream are generated by coder 203 for enhancing the quality of the recovered signal which contain spectral information concerning relatively high frequency components of the audio signal, e.g., in the 4.5 kHz to 10 kHz range. To that end, the quantized MDCT coefficients from quantizer 415 are subtracted by subtracter 429 from the MDCT output of filterbank 409. The resulting difference signals are duplicated by duplicator 431, and then bandlimited respectively by band-pass filters (BPFs) 423 and 433 to the 4.5 to 10 kHz range. Each of quantizers 443 and 453 receives a copy of the filtered difference signals and quantizes the received signals according to predetermined stepsizes.

Quantizers 443 and 453 may be scalar quantizers or multidimensional quantizers, and may comprise a complementary quantizer pair. Complementary scalar quantizers are well known in the art, and described, e.g., in V. Vaishampayan, "Design of Multiple Description of Scalar Quantizers," *IEEE Transactions on Information Theory*, Vol. 39, No. 3, May 1993, pp. 821–834. In general, a pair of complementary scalar quantizers may be defined by the following encoder functions $f_1$ and $f_2$, respectively:

$$f_1(x):\Re\rightarrow\{x_i\}_{i=1}^{m1},$$

and $$f_2(y):\Re\rightarrow\{y_j\}_{j=1}^{m2},$$

where $\Re$ represents the real axis, $m1=2^{S1}$ and $m2=2^{S2}$, where S1 and S2 represent the bit rates for quantizers 443 and 453, respectively. As is well known, associated with each of the quantized values $x_i$ and $y_j$ for $f_1$ and $f_2$, respectively, is a range or partition [x, y) on the real axis such that all the values in this range are quantized to $x_i$ or $y_j$.

In prior art, to take advantage of the correlation between $x_i$ and $y_j$ from $f_1$ and $f_2$ having a complementary relationship, joint decoding, also known as "center decoding," on $(x_i, y_j)$ is performed in a de-quantizer to realize the optimum decoded value $z_k$ such that the resulting distortion or quantization error is minimized. The center decoding function, $\bar{d}$, performed in the de-quantizer may be expressed as follows:

$$\bar{d}(x, y): \{(x_i, y_j)\}_{i=1,j=1}^{i=m1,j=m2} \rightarrow \{z_k\}_{k=1}^{m}.$$

It should be noted that not all $(x_i, y_j)$ are valid decodable combinations depending upon the overlap between their associated partitions. Let $Q_1$, $Q_2$ and $\bar{Q}$ be the average distortions associated with $f_1$, $f_2$ and center decoding function $\bar{d}$, respectively, and let's assume that $f_1$ and $f_2$ are equivalent, i.e., S1=S2=S. If $Q_1<2^{-2S}$ and $Q_2<2^{-2S}$, by minimizing $\bar{Q}$ subject to the condition $Q_1$ and $Q_2\leqq Q$, where Q is a predetermined distortion value, it can be shown that the value of $\bar{Q}$ is always greater than the following limit:

$$\bar{Q}>\tfrac{1}{2}2^{-2S}$$

That is, use of the complementary scalar quantizers affords at most a 3 dB gain, compared with the case where only an individual scalar quantizer is used.

However, it has been recognized that the average distortion $\bar{Q}$ associated with center decoding can be improved if the complementary quantizers used are multidimensional, rather than scalar as in prior art. In this illustrative embodiment, quantizers 443 and 453 are complementary multidimensional quantizers. Preferably, they are non-homogeneous multidimensional lattice quantizers.

Figure 4B:
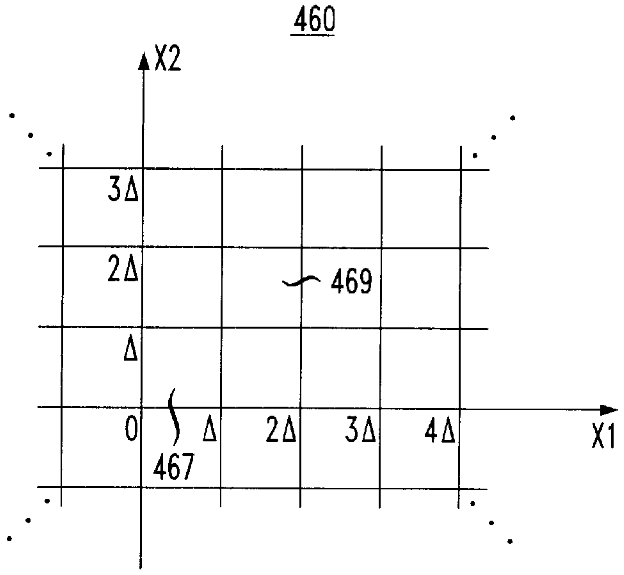
FIG. 4B PRIOR ART
FIG. 4B illustrates a homogeneous multidimensional lattice based on which a prior art quantizer performs quantization.

In order to more appreciate the advantages of use of complementary non-homogeneous multidimensional lattice quantizers, let's first consider a prior art homogeneous 2-dimensional lattice quantizer using a square lattice in a 2-dimensional region for quantization. FIG. 4B illustrates one such 2-dimensional region which is defined by X1 and X2 axes and denoted 460. Region 460 in this instance has a square lattice and contains Voronoi regions or cells, e.g., cells 467 and 469, whose length is denoted Δ, where Δ represents a predetermined value. As shown in FIG. 4B, these cells are homogeneously distributed throughout region 460, and are each identified by a different code. As is well known, in the quantization process, the prior art quantizer assigns to an input sample point (x1, x2) the code identifying the cell in which the sample point falls, where x1∈X1 and x2∈X2. For example, sample points having $0\leqq$x1<Δ, and $0\leqq$x2<Δ are each assigned the code identifying cell 467. In addition, sample points having $\Delta\leqq$x1<2Δ, and $\Delta\leqq$x2<2Δ are each assigned the code identifying cell 469. In practice, each code assignment is achieved by looking up a codebook.

The above prior art quantizer imposes an average distortion proportional to $\Delta^2$ which in turn is proportional to $2^{-2S}$, where in the multidimensional case here S represents the number of bits/sample/dimension multiplied by the sample rate.

Figure 4C:
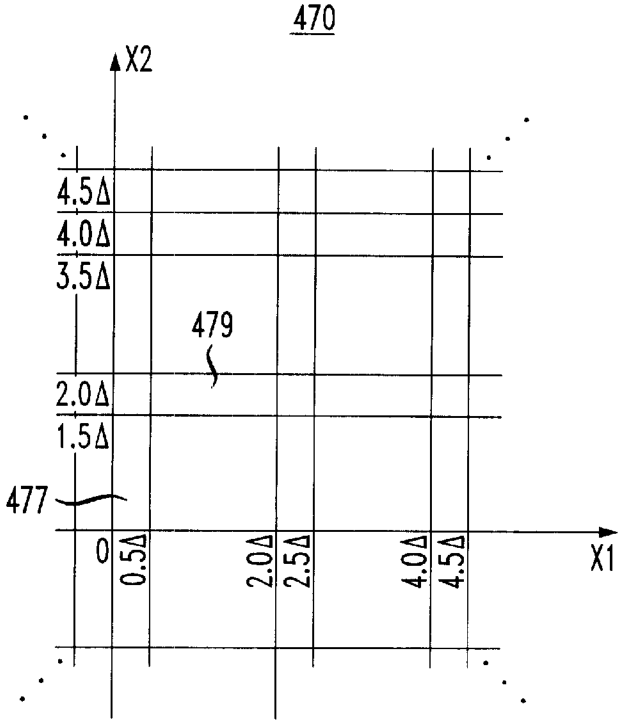
FIG. 4C illustrates a first non-homogeneous multidimensional lattice based on which a first complementary quantizer performs quantization.

As mentioned before, in the preferred embodiment, quantizers 443 and 453 are. complementary non-homogeneous multidimensional lattice quantizers. For example, in the 2-dimensional case, quantizers 443 and 453 use non-homogeneous rectangular lattices in 2-dimensional regions 470 and 490, respectively. In FIG. 4C, like region 460, region 470 is defined by X1 and X2 axes. However, unlike region 460, region 470 contains Voronoi regions or cells, e.g., cells 467 and 469, which are in different shapes and thus non-homogeneous throughout region 470. By way of example, the vertical boundaries of the rectangular cells in region 470 intersect the X1 axis at x1=0, 0.5Δ, 2.0Δ, 2.5Δ, 4.0Δ . . . , with the separations between successive vertical boundaries alternating between 0.5Δ and 1.5Δ. On the other hand, the horizontal boundaries of the rectangular cells in region 470 intersect the X2 axis at x2=0, 1.5Δ, 2.0Δ, 3.5Δ, 4.0Δ . . . , with the separations between successive horizontal boundaries alternating between 1.5Δ and 0.5Δ. In the quantization process, quantizer 443 assigns to an input sample point (x1, x2) the code identifying the cell in which the sample point falls. For example, sample points having $0\leqq$x1<0.5Δ, and $0\leqq$x2<1.5Δ are each assigned the code identifying cell 477. In addition, sample points having $0.5\Delta\leqq$x1<2.0Δ, and $1.5\Delta\leqq$x2<2.0Δ are each assigned the code identifying cell 479.

Figure 4D:
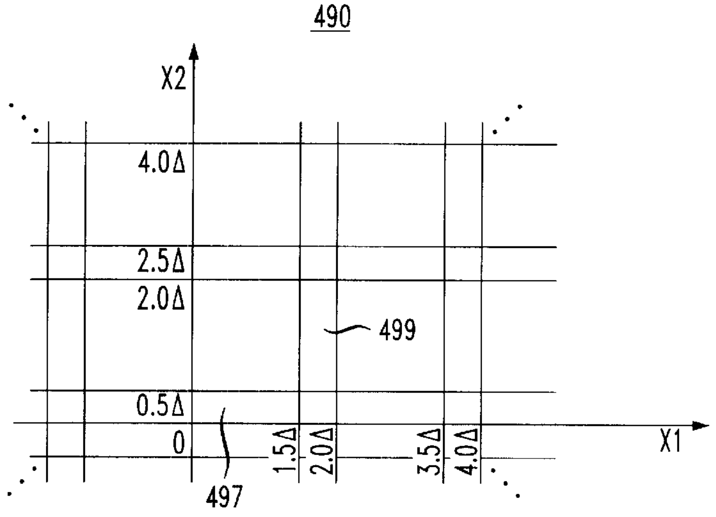
FIG. 4D illustrates a second non-homogeneous multidimensional lattice based on which a second complementary quantizer performs quantization.

A simple way of designing the rectangular lattice in region 490 of quantizer 453, which is complementary to quantizer 443, is to adopt the vertical and horizontal boundaries in region 470 as the horizontal and vertical boundaries in region 490, respectively. FIG. 4D illustrates the resulting region 490 containing cells, e.g., cells 491 and 499, which are in different shapes, and thus non-homogeneous throughout region 490. In the quantization process, quantizer 453 assigns to an input sample point (x1, x2) the code identifying the cell in which the sample point falls. For example, sample points having $0 \leqq x1 < 1.5\Delta$, and $0 \leqq x2 < 0.5\Delta$ A are each assigned the code identifying cell 497. In addition, sample points having $1.5\Delta \leqq x1 < 2.0\Delta$, and $0.5\Delta < x2 < 2.0\Delta$ are each assigned the code identifying cell 499.

It can be shown that the average distortion for an individual one of quantizers 443 and 453 equals $1.25\epsilon 2^{-2S}$, where $\epsilon$ represents a constant which depends on the probability density function of the input signal to the quantizer, and S in this instance equals 16 kb/s. However, stemming from the fact that quantizers 443 and 453 are complementary quantizers, center decoding on the quantized values from quantizers 443 and 453 respectively can be performed in a de-quantizer. It can be shown that the average distortion $\overline{Q}$ associated with 2-dimensional center decoding is no more than $0.25\epsilon 2^{-2S}$. That is, complementary quantizers 443 and 453 when implemented with the 2-dimensional center decoding command a 6 dB improvement in terms of distortion over their scalar counterparts.

The equivalent lattices of three and higher dimensions of complementary quantizers may be obtained similarly to those of two dimensions described above. However, in three or higher dimensions, it is more advantageous to use a non-homogeneous, non-rectangular (or non-hypercube) lattice in each complementary quantizer.

Referring back to FIG. 4A, the quantized signals from quantizer 443 are fed to loss-less compressor 445 which, like compressor 419, achieves bit compression on the quantized signals, resulting in the $E_1$-stream on lead 209*b*. The $E_1$-stream is fed back to quantizer 443 through rate-loop processor 447 to ensure that the bit rate of $E_1$-stream is maintained at its target rate, which in this instance is S1=16 kb/sec.

Similarly, the quantized signals from quantizer 453 are fed to loss-less compressor 455 which achieves bit compression on the quantized signals, resulting in the $E_2$-stream on lead 209*c*. The $E_2$-stream is fed back to quantizer 453 through rate-loop processor 457 to ensure that the bit rate of $E_2$-stream is maintained at its target rate, which in this instance is S2=16 kb/sec.

Figure 5:
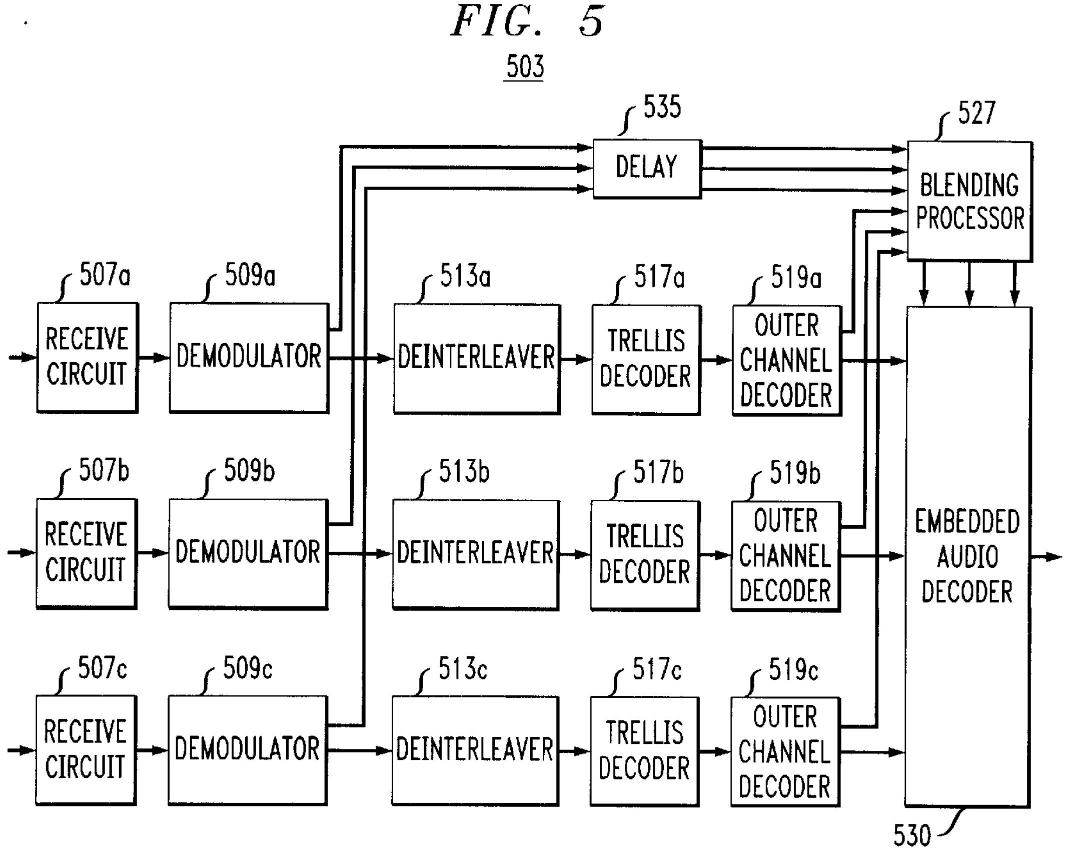
FIG. 5 is a block diagram of a receiver for recovering the audio information.

Referring to FIG. 5, receiver 503 receives signals transmitted by transmitter 203 through subbands 303, 305 and 307, respectively. The received signals corresponding to the C-stream, $E_1$-stream and $E_2$-stream are processed by receive circuits 507*a*, 507*b* and 507*c*, which perform inverse functions to above-described transmit circuits 235*a*, 235*b* and 235*c*, respectively. The output of circuit 507*a* comprises the $K_1$ pulse shaping carriers as transmitted, which are fed to demodulator 509*a*. Accordingly, demodulator 509*a* generates a sequence of symbols containing the core audio information. The generated symbols are de-interleaved by de-interleaver 513*a* which performs the inverse function to interleaver 227*a* described above. Based on the de-interleaved symbols and the signal constellation used in trellis coder 221*a*, trellis decoder 517*a* in a conventional manner determines what the most likely transmitted symbols are in accordance with the well known Viterbi algorithm, thereby recovering the C-stream incorporating Reed Solomon check symbols therein, i.e., the Reed Solomon coded C-stream. Outer channel decoder 519*a* extracts the Reed Solomon check symbols from blocks of the Reed Solomon coded C-stream bits, and examines the Reed Solomon check symbols in connection with the corresponding blocks of C-stream bits. Each block of C-stream bits may contain errors because of the channel imperfection, e.g., interference with the transmitted signals in subband 303. If the number of errors in each block is smaller than a threshold whose value depends on the actual Reed Solomon coding technique used, decoder 519*a* corrects the errors in the block. However, if the number of errors in each block is larger than the threshold and the errors are detected by decoder 519*a*, the latter issues, to blending processor 527 described below, a first flag indicating the error detection. Decoder 519*a* then provides the recovered C-stream to embedded audio decoder 530.

Similarly, the output of circuit 507*b* comprises the $K_2$ pulse shaping carriers corresponding to the $E_1$-stream, which are fed to demodulator 509*b*. Accordingly, demodulator 509*b* generates a sequence of symbols containing the first enhancement audio information. The generated symbols are de-interleaved by de-interleaver 513*b* which performs the inverse function to interleaver 227*b* described above. Based on the de-interleaved symbols and the signal constellation used in trellis coder 221*b*, trellis decoder 517*b* in a conventional manner determines what the most likely transmitted symbols are in accordance with the Viterbi algorithm, thereby recovering the $E_1$-stream incorporating Reed Solomon check symbols therein, i.e., the Reed Solomon coded $E_1$-stream. Outer channel decoder 519*b* extracts the Reed Solomon check symbols from blocks of the Reed Solomon coded $E_1$-stream bits, and examines the Reed Solomon check symbols in connection with the corresponding blocks of $E_1$-stream bits. Each block of $E_1$-stream bits may contain errors because of the channel imperfection, e.g., second adjacent channel interference with the transmitted signals in subband 305. If the number of errors in each block is smaller than the aforementioned threshold, decoder 519*b* corrects the errors in the block. However, if the number of errors in each block is larger than the threshold and the errors are detected by decoder 519*b*, the latter issues, to blending processor 527, a second flag indicating the error detection. Decoder 519*b* then provides the recovered $E_1$-stream to embedded audio decoder 530.

In addition, the output of circuit 507*c* comprises the $K_3$ pulse shaping carriers corresponding to the $E_2$-stream, which are fed to demodulator 509*c*. Accordingly, demodulator 509*c* generates a sequence of symbols containing the second enhancement audio information. The generated symbols are de-interleaved by de-interleaver 513*c* which performs the inverse function to interleaver 227*c* described above. Based on the de-interleaved symbols and the signal constellation used in trellis coder 221*c*, trellis decoder 517*c* in a conventional manner determines what the most likely transmitted symbols are in accordance with the Viterbi algorithm, thereby recovering the $E_2$-stream incorporating Reed Solomon check symbols therein, i.e., the Reed Solomon coded $E_2$-stream. Outer channel decoder 519*c* extracts the Reed Solomon check symbols from blocks of the Reed Solomon coded $E_2$-stream bits, and examines the Reed Solomon check symbols in connection with the corresponding blocks of $E_2$-stream bits. Each block of $E_2$-stream bits may contain errors because of the channel imperfection, e.g., second adjacent channel interference with the transmitted signals in subband 307. If the number of errors in each block is smaller than the aforementioned threshold, decoder 519*c* corrects the errors in the block. However, if the number of errors in each block is larger than the threshold and the errors are detected by decoder 519*c*, the latter issues, to blending processor 527, a third flag indicating the error detection. Decoder 519*c* then provides the recovered $E_2$-stream to embedded audio decoder 530.

Embedded audio decoder 530 performs the inverse function to embedded audio coder 203 described above and is capable of blending the received C-stream, $E_1$-stream and $E_2$-stream to recover an audio signal corresponding to a(t).

However, blending processor 527 determines any of the $E_1$-stream and $E_2$-stream to be blended with the C-stream in decoder 530. Such a determination is based on measures of data integrity of the $E_1$-stream and $E_2$-stream. Blending processor 527 may also determine the viability of the C-stream based on a measure of its data integrity, and control any audio signal output based on the C-stream from receiver 503. To that end, processor 527 provides first, second and third control signals indicative of the determinations of use of the C-stream, $E_1$-stream and $E_2$-stream, respectively, in decoder 530 to recover the audio signal. In response to such control signals, decoder 530 accordingly (a) operates at the full rate and utilizes all three streams to recover the audio signal, (b) blends to a lower bit rate and utilizes the C-stream in combination with the $E_1$-stream or $E_2$-stream to recover the audio signal, (c) operates at the lowest bit rate and utilizes only the C-stream to recover the audio signal, or (d) recovers no audio signal based on the C-stream. To avoid event (d), although rare, remedial methodologies may be implemented, including transmitting the audio signal through the AM band as a conventional analog AM signal, and recovering the audio signal based on the analog AM signal in the receiver when event (d) occurs.

The measures based on which processor 527 determines whether any of the C-stream, $E_1$-stream and $E_2$-stream is used in recovering the audio signal include, e.g., the frequencies of the first, second and third flags received by processor 527, which are indicative of bit errors in the received C-stream, $E_1$-stream and $E_2$-stream, respectively. The actual frequency threshold beyond which the corresponding stream is rejected or "muted" depends on bit rate of the stream, output quality requirements, etc.

The aforementioned measures may also include an estimate of a signal-to-interference ratio concerning each subband obtained during periodic training of each of modems **230*a*, 230*b* and 230*c*. Since these modems implement multilevel signaling and operate in varying channel conditions, a training sequence with known symbols is used for equalization and level adjustments in demodulators 509*a*, 509*b* and 509*c* periodically. Such a training sequence can be used to estimate the signal-to-interference ratio. When such an estimate goes below an acceptable threshold, blending processor 527 receives an exceptional signal from the corresponding demodulator. In response to the exceptional signal, and depending on other measures, processor 527 may issue a control signal concerning the stream associated with the demodulator to cause decoder 530 to mute the stream. As the exceptional signal needs to be time aligned with the portion of the stream affected by the substandard signal-to-interference ratio, delay element 535** is employed to compensate for the delay imparted to such a stream portion in traversing the deinterleaver and intervening decoders.

The foregoing merely illustrates the principles of the invention. It will thus be appreciated that those skilled in the art will be able to devise numerous other arrangements which embody the principles of the invention and are thus within its spirit and scope.

Figure 6A:
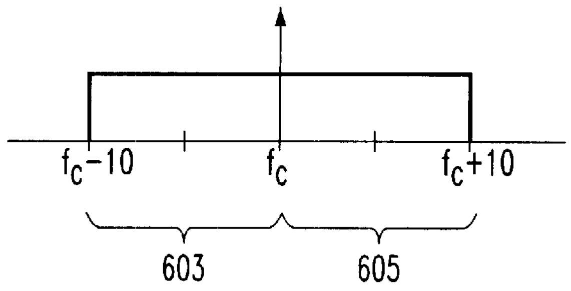
FIG. 6A illustrates a power profile of digitally modulated signals representing two bit streams containing audio information transmitted over two subbands, respectively.

For example, in the disclosed embodiment, three streams, i.e., the C-stream, $E_1$-stream and $E_2$-stream are used to represent the audio information to be transmitted. However, it will be appreciated that the number of such streams used may be higher or lower than three. For instance, a dual stream approach using two digital subbands 603 and 605 is illustrated in FIG. 6A. This approach is particularly advantageous where the allowed digital bandwidth is relatively narrow, which is 20 kHz in this instance, with respect to that of digital band 101. In accordance with the dual stream approach, the C-stream is transmitted through subband 603, and an E-stream, which may be identical to the $E_1$-stream or $E_2$-stream, for enhancing the C-stream is transmitted through subband 605 which, unlike subband 603, is subject to severe adjacent channel interference in certain coverage areas. When subband 605 is indeed afflicted by severe adjacent channel interference, e.g., the first adjacent channel interference, the E-stream is muted and the audio signal is recovered based on the C-stream alone. Of course, in other coverage areas where subband 603 is subject to severe adjacent channel interference while subband 605 is not, the C-stream is transmitted through subband 605 while the E-stream is transmitted through subband 603. However, if the receiver for recovering the audio signal is mobile and roams from one coverage area to another, it is desirable to have a control channel to inform the receiver of which of the above two alternative subband arrangements is being implemented in the transmitter. Such a control channel may be incorporated into one of the multilevel signaling modems, transmitting the C-stream and E-stream, as a modem control channel. Alternatively, the control information may be made part of the C-stream or E-stream by the embedded audio coder.

Figure 6B:
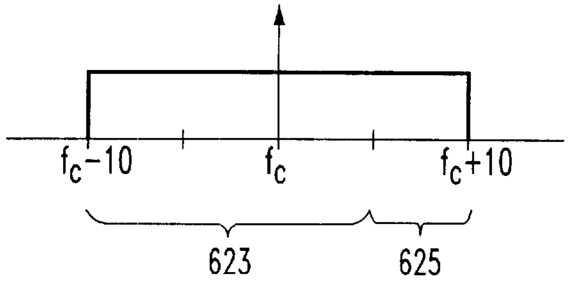
FIG. 6B illustrates a power profile of digitally modulated signals representing two bit streams containing audio information transmitted over a first set of asymmetric subbands.
Figure 6C:
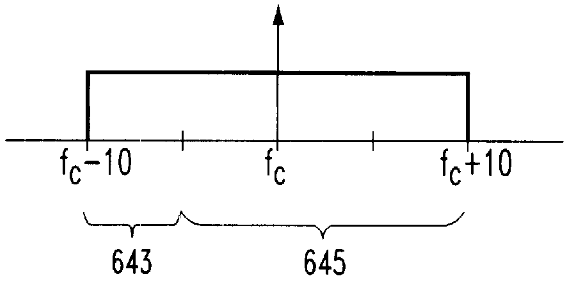
FIG. 6C illustrates a power profile of digitally modulated signals representing two bit streams containing audio information transmitted over a second set of asymmetric subbands.

It should be noted at his point that subband 603 and 605 in this instance are symmetric about $f_c$. However, the C-stream and E-stream may be transmitted in asymmetric subbands illustrated in FIG. 6B or FIG. 6C. This adaptive two stream asymmetric approach is particularly advantageous where interference afflicts primarily the outer 5 kHz segment denoted 625 in FIG. 6B or 643 in FIG. 6C. For example, in FIG. 6B, the C-stream and E-stream may be transmitted at 32 kb/s and 16 kb/s over subbands 623 and 625, respectively. Similarly, in FIG. 6C, the C-stream and E-stream may be transmitted at 32 kb/s and 16 kb/s over subbands 645 and 643, respectively.

In addition, as mentioned before, an audio signal with digital quality can only be regenerated when the C-stream is viable. However, it will be appreciated that the audio signal may also be transmitted through the AM band as a host analog AM signal according to a mixed blending approach. In that approach, if the C-stream is lost and at least one $E_i$-stream is recovered in the receiver, the $E_i$-stream may be used to enhance the analog audio signal output, where i generically represents an integer greater than or equal to one. For example, the $E_i$-stream can be used to add high frequency content and/or stereo components to the analog signal. If all of the $E_i$- and C-streams are lost, the receiver would afford only the analog audio signal output.

Figure 7:
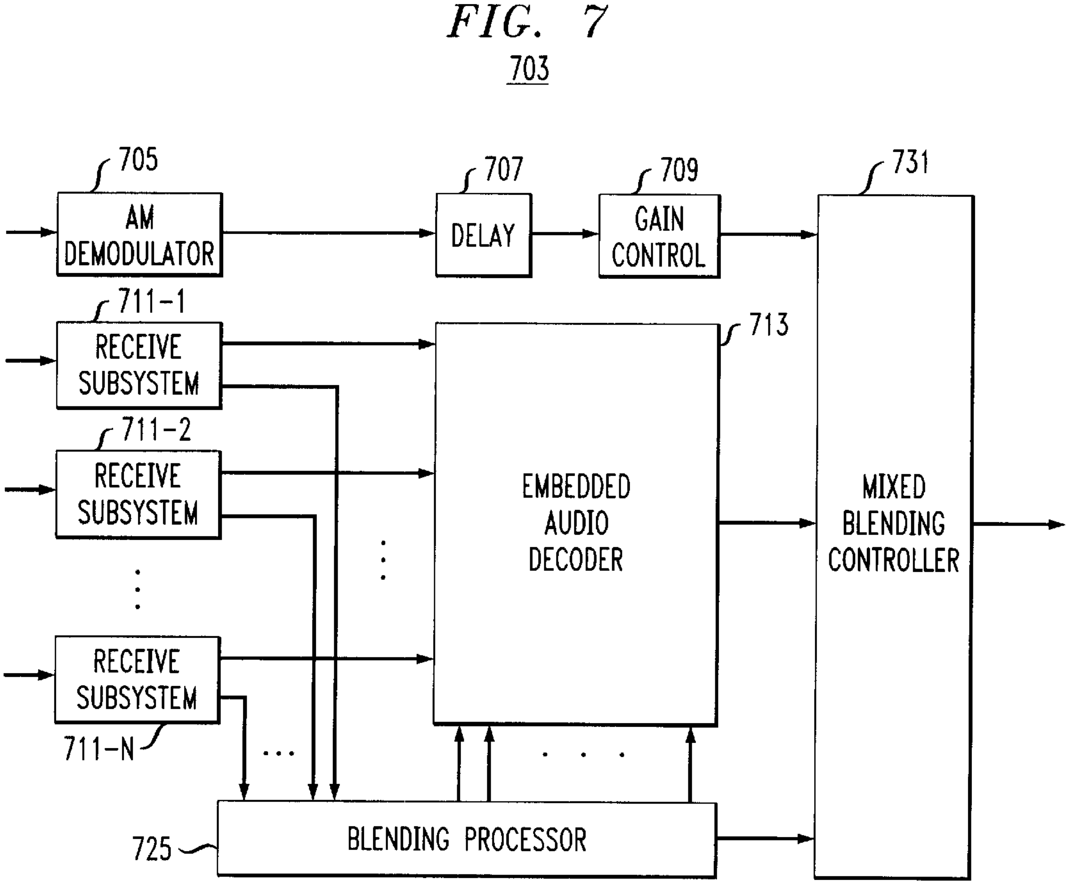
FIG. 7 is a block diagram of a receiver for recovering audio information in accordance with an inventive mixed blending approach.

FIG. 7 illustrates receiver 703 embracing the aforementioned mixed blending approach in accordance with the invention. The above host analog AM signal is demodulated using AM demodulator 705 in a conventional manner. The resulting analog audio signal is used as the fall back signal in the event that all of the C- and $E_i$-streams are severely corrupted by noise and/or interference. The digitally modulated signals corresponding to such C- and $E_i$- streams are fed to receive subsystems 711-1 through 711-N, respectively, where N represents the total number of streams used, and thus i<N. Each receive subsystem includes system components similar to those of receive circuit **507*a*, demodulator 509*a*, deinterleaver 513*a*, channel decoder 517*a* and source decoder 519*a* described above. The receive subsystems 711-1 through 711-N provide the respective streams to embedded audio decoder 713 similar to decoder 530 described before. Each receive subsystem also provides, to blending processor 725**, flags concerning bit errors, exceptional signals concerning the signal-to-interference ratio, etc. in the corresponding stream.

Similar to blending processor 527, blending processor 725 sends control signals to decoder 713 to mute any of the streams provided thereto depending on its data integrity indicated by the frequency of the respective flags and exceptional signals, etc. However, in the event that the C-stream is not viable, blending processor 725 causes mixed blending controller 731 to output the recovered analog audio signal, enhanced by any surviving $E_i$-streams. To that end, the surviving enhancement streams are time aligned with the analog audio signal using delay element 707. The amplitude of the analog audio signal is adjusted by gain control 709 before entering controller 731.

Figure 8:
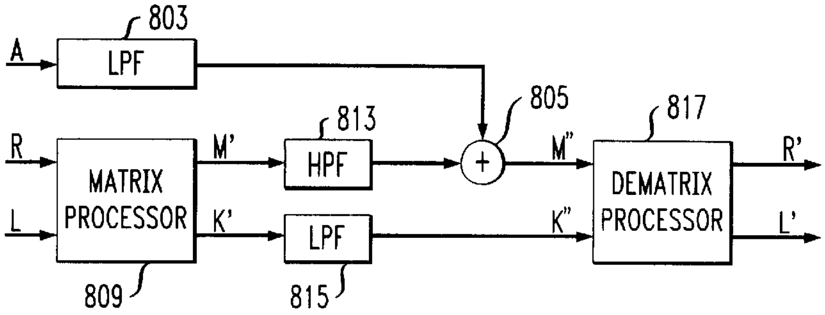
FIG. 8 is a block diagram of a mixed blending controller in the receiver of FIG. 7.

FIG. 8 illustrates an effective configuration of mixed blending controller 731 where the C-stream is lost. In this illustrative embodiment, the surviving enhancement streams from decoder 713 represent stereo signals having signal levels R and L, respectively. These stereo signals are used to enhance the mono-audio signal having a signal level A from gain control 709, which balances A with R and L. The mono-audio signal is processed by low-pass filter (LPF) 803 to filter out high frequency components thereof. Adder 805 adds, to the filtered signal, high frequency components derived in a manner described below from the stereo signals for enhancement.

The stereo signals are processed by matrix processor 809 according to the following expressions:

$$M' = \frac{R+L}{2},$$

and $$K' = \frac{R-L}{2},$$

where M' and K' respectively represent the signal levels of first and second outputs of processor 809. The first output is filtered by high-pass filter (HPF) 813 to provide the aforementioned high frequency components to adder 805. The resulting sum signal from adder 805 having a signal level M" is provided to dematrix processor 817.

Figure 9:
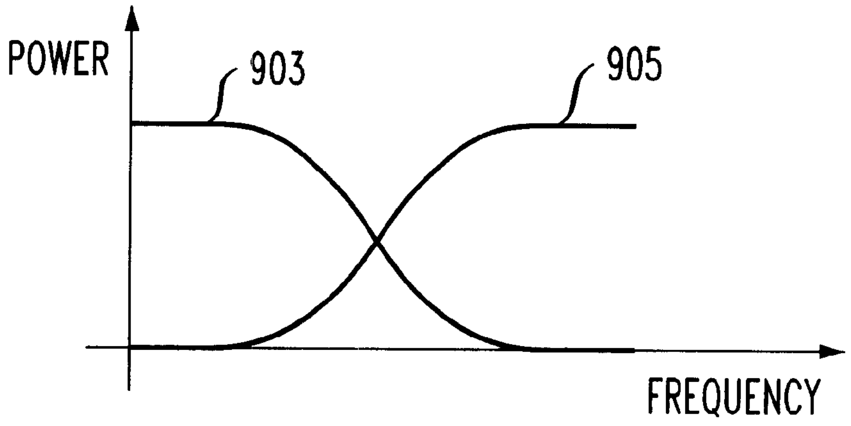
FIG. 9 illustrates frequency responses of first and second filters in the mixed blending controller of FIG. 8.

It should be noted at this point that HPF 813 and LPF 803 are power balanced (complementary) filters, with their characteristics shown in FIG. 9. Plots 903 and 905 represent the frequency responses of LPF 803 and HPF 813, respectively.

Referring back to FIG. 8, the second output from processor 809 is filtered by LPF 815, rendering a filtered signal having a signal level K". This filtered signal is processed by processor 817, along with the above sum signal, according to the following expressions:

$$R'=M''+K'',$$

and $$L'=M''-K'',$$

where R' and L' respectively represent the signal levels of the right and left channel components of a stereo audio signal output from mixed blending controller 731.

In addition, in the disclosed embodiment, complementary quantizers are used to generate equivalent enhancement bit streams, e.g., $E_1$-stream and $E_2$-stream, for communications. However, based on the disclosure heretofore, it is apparent that a person skilled in the art may use similar complementary quantizers to generate equivalent C-streams, e.g., $C_1$-stream and $C_2$-stream, for communications. In an alternative embodiment, for instance, a(t) may be coded in accordance with the invention to yield an enhancement bit stream, and $C_1$- and $C_2$-streams at 8 kb/sec, 20 kb/sec and 20 kb/sec, respectively.

Further, in the disclosed embodiment, for example, subband 303 is used to transmit the C-stream. It will be appreciated that one may further subdivide, e.g., subband 303 equally for transmission of duplicate versions of the C-stream, or equivalent C-streams, to afford additional robustness to the core audio information.

In addition, the multistream coding schemes described above are applicable to various sizes of digital bands surrounding an analog host AM carrier at $f_c$, e.g., $f_c$±5 kHz, $f_c$±10 kHz, $f_c$±15 kHz, $f_c$±20 kHz, etc.

Further, the multistream coding schemes described above are applicable to communications of not only audio information, but also information concerning text, graphics, video, etc.

Still further, the multistream coding schemes, and the mixed blending technique described above are applicable not only to the hybrid IBOC AM systems, but also other systems, e.g., hybrid IBOC FM systems, satellite broadcasting systems, Internet radio systems, TV broadcasting systems, etc.

Moreover, the multistream coding schemes can be used with any other well known channel coding different than the Reed-Solomon coding described above such as the Bose-Chandhuri-Hocquenghem (BCH) coding, etc., with or without unequal error protection (UEP) sensitivity classifications.

In addition, in the disclosed embodiment, multicarrier modems 230*a*, 230*b* and 230*c* illustratively implement an OFDM scheme. It will be appreciated that a person skilled in the art may utilize in such a modem any other scheme such as a frequency division multiplexed tone scheme, time division multiplexed (TDM) scheme, or code division multiplexed (CDM), instead.

Further, the frequency subbands for transmission of individual bit streams in the multistream coding approach need not be contiguous. In addition, the channel coding and interleaving techniques applied to different subbands may not be identical.

Still further, each frequency subband may be used for transmission of multiple bit streams in the multistream coding approach by time-sharing the frequency subband in accordance with a well known time division multiple access (TDMA) scheme, or by code-sharing the frequency subband in accordance with a well known code division multiple access (CDMA) scheme, or by sharing the frequency subband in another manner in accordance with a similar implicit partitioning of the subband.

Figure 10:
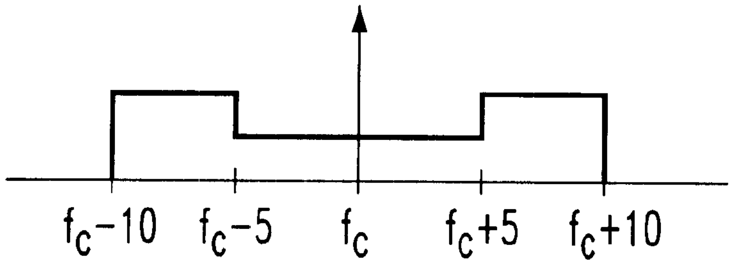
FIG. 10 illustrates a non-uniform power profile of digitally modulated signals representing multiple bit streams transmitted over the AM frequency band.

Yet still further, the power profiles of the digitally modulated signals in the multistream coding approach may not be uniform across the transmission band. FIG. 10 illustrates an example of one such non-uniform power profile, where the power profile in the subband $f_c$−5 kHz through $f_c$+5 kHz is relatively low compared with that in the rest of the band to reduce any interference of the digitally modulated signals with the host analog AM signal occupying the same subband.

Finally, transmitter 203, and receivers 503 and 703 are disclosed herein in a form in which various transmitter and receiver functions are performed by discrete functional blocks. However, any one or more of these functions could equally well be embodied in an arrangement in which the functions of any one or more of those blocks or indeed, all of the functions thereof, are realized, for example, by one or more appropriately programmed processors.

We claim:

1. Apparatus for communicating a signal over one or more frequency bands, the apparatus comprising:

a generator for generating a plurality of representations each containing information descriptive of the signal, the plurality of representations thereby each being descriptive of at least a portion of the same signal, at least one of the representations containing information different than that contained in every other representation, each representation being associated with one of the frequency bands; and transmit circuitry for transmitting each representation through the frequency band associated with the representation;

wherein the representations are configured such that quality of a corresponding recovered signal generated from one or more of the representations is a function of the particular number of the representations used to generate the recovered signal.

2. The apparatus of claim 1 wherein one of the frequency bands includes a carrier frequency used for radio broadcast.

3. The apparatus of claim 2 wherein the carrier frequency is an AM carrier frequency.

4. The apparatus of claim 1 wherein the one or more frequency bands comprise a plurality of frequency bands, at least two of the frequency bands being contiguous to each other.

5. The apparatus of claim 1 wherein the information includes audio information.

6. The apparatus of claim 1 wherein the information is encoded in accordance with a forward error correction coding technique.

7. The apparatus of claim 6 wherein the forward error correction coding technique includes a Reed Solomon coding technique.

8. The apparatus of claim 1 wherein the at least one representation is more generally descriptive of the signal than a second one of the representations.

9. The apparatus of claim 8 wherein the frequency bands are subject to interference, the frequency band associated with the at least one representation being less affected by the interference than the other frequency bands.

10. Apparatus for recovering a signal, the apparatus comprising:

receive circuitry for receiving, through one or more frequency bands, a plurality of representations each containing information descriptive of the signal, the plurality of representations thereby each being descriptive of at least a portion of the same signal, at least one of the representations containing information different than that contained in every other representation, each representation being associated with one of the frequency bands, each representation being received through the frequency band associated with the representation; and recovery circuitry for recovering the signal using selected one or more of the representations, wherein the representations are configured such that quality of a corresponding recovered signal generated from one or more of the representations is a function of the particular number of the representations used to generate the recovered signal, the recovered signal thereby having a quality depending on the selected representations used.

11. The apparatus of claim 10 wherein the selected representations include the at least one representation which is more generally descriptive of the signal than a second one of the representations.

12. The apparatus of claim 11 wherein the frequency bands are subject to interference, the frequency band associated with the at least one representation being less affected by the interference than the other frequency bands.

13. The apparatus of claim 10 wherein the plurality of representations include an AM version of the signal.

14. The apparatus of claim 13 wherein the recovery circuitry includes an AM demodulator for demodulating the AM version of the signal.

15. The apparatus of claim 13 wherein the selected representations include either of the AM version of the signal and the at least one representation.

16. The apparatus of claim 10 wherein one of the frequency bands includes a carrier frequency used for radio broadcast.

17. The apparatus of claim 16 wherein the carrier frequency is an AM carrier frequency.

18. The apparatus of claim 10 wherein the information is encoded in accordance with a forward error correction coding technique.

19. The apparatus of claim 18 wherein the forward error correction coding technique includes a Reed Solomon coding technique.

20. The apparatus of claim 10 wherein the information includes audio information.

21. The apparatus of claim 10 wherein the one or more frequency bands comprise a plurality of frequency bands, at least two of the frequency bands being contiguous to each other.

22. The apparatus of claim 10 wherein the quality is a function of a perceptually based measure.

23. Receiver apparatus comprising:

receive circuitry for receiving a plurality of representations representing a signal via one or more frequency bands subject to interference, the plurality of representations thereby each being descriptive of at least a portion of the same signal, each representation being associated with one of the frequency bands, each representation being received via the frequency band associated with the representation;

a processor for selecting at least one of the representations based on a measure of any corruption of the selected representation resulting from the interference affecting the frequency band associated therewith; and recovery circuitry responsive to the selected representation for recovering the signal;

wherein the representations are configured such that quality of a corresponding recovered signal generated from one or more of the representations is a function of the particular number of the representations used to generate the recovered signal.

24. The apparatus of claim 23 wherein the one or more frequency bands comprise a plurality of frequency bands, at least two of the frequency bands being contiguous to each other.

25. The apparatus of claim 23 wherein the information is encoded in accordance with a forward error correction coding technique.

26. The apparatus of claim 25 wherein the measure is a function of a count of detections of errors in the selected representation, in accordance with the forward error correction coding technique.

27. The apparatus of claim 23 wherein the measure is a function of a signal-to-interference ratio afforded by the frequency band associated with the selected representation.

28. The apparatus of claim 23 wherein the selected representation includes an AM version of the signal.

29. The apparatus of claim 28 wherein the recovery circuitry includes an AM demodulator for demodulating the AM version of the signal.

30. The apparatus of claim 23 wherein one of the frequency band s includes a carrier frequency used for radio broadcast.

31. The apparatus of claim 30 wherein the carrier frequency is an AM carrier frequency.

32. A method for communicating a signal over one or more frequency bands, the method comprising:

generating a plurality of representations each containing information descriptive of the signal, the plurality of representations thereby each being descriptive of at least a portion of the same signal, at least one of the representations containing information different than that contained in every other representation;

assigning each representation to one of the frequency bands; and transmitting each representation through the frequency band to which the representation is assigned;

wherein the representations are configured such that quality of a corresponding recovered signal generated from one or more of the representations is a function of the particular number of the representations used to generate the recovered signal.

33. The method of claim 32 wherein the frequency band includes a carrier frequency used for radio broadcast.

34. The method of claim 33 wherein the carrier frequency is an AM carrier frequency.

35. The method of claim 32 wherein the one or more frequency bands comprise a plurality of frequency bands, at least two of the frequency bands being contiguous to each other.

36. The method of claim 32 wherein the information is encoded in accordance with a forward error correction coding technique.

37. The method of claim 36 wherein the forward error correction coding technique includes a Reed Solomon coding technique.

38. The method of claim 32 wherein the at least one representation is more generally descriptive of the signal than a second one of the representations.

39. The method of claim 38 wherein the frequency bands are subject to interference, the frequency band assigned to the at least one representation being less affected by the interference than the other frequency bands.

40. A method for recovering a signal, the method comprising:

receiving, through one or more frequency bands, a plurality of representations each containing information descriptive of the signal, the plurality of representations thereby each being descriptive of at least a portion of the same signal, at least one of the representations containing information different than that contained in every other representation, each representation being associated with one of the frequency bands, each representation being received through the frequency band associated with the representation; and recovering the signal using selected one or more of the representations, wherein the representations are configured such that quality of a corresponding recovered signal generated from one or more of the representations is a function of the particular number of the representations used to generate the recovered signal, the recovered signal thereby having a quality depending on the selected representations used.

41. The method of claim 40 wherein the selected representations include the at least one representation which is more generally descriptive of the signal than a second one of the representations.

42. The method of claim 41 wherein the frequency bands are subject to interference, the frequency band associated with the at least one of the representations being less affected by the interference than the other frequency bands.

43. The method of claim 40 wherein the plurality of representations include an AM version of the signal.

44. The method of claim 43 further comprising demodulating the AM version of the signal.

45. The method of claim 43 wherein the selected representations include either of the AM version of the signal and the at least one of the representations.

46. The method of claim 40 wherein one of the frequency bands includes a carrier frequency used for radio broadcast.

47. The method of claim 46 wherein the carrier frequency is an AM carrier frequency.

48. The method of claim 40 wherein the one or more frequency bands include a plurality of frequency bands, at least two of the frequency bands being contiguous to each other.

49. The method of claim 40 wherein the information is encoded in accordance with a forward error correction coding technique.

50. The method of claim 49 wherein the forward error correction coding technique includes a Reed Solomon coding technique.

51. The method of claim 40 wherein the information includes audio information.

52. The method of claim 40 wherein the quality is a function of a perceptually based measure.

53. A method for use in a receiver apparatus comprising:

receiving a plurality of representations representing a signal via one or more frequency bands subject to interference, the plurality of representations thereby each being descriptive of at least a portion of the same signal, each representation being associated with one of the frequency bands, each representation being received via the frequency band associated with the representation;

selecting at least one of the representations based on a measure of any corruption of the selected representation resulting from the interference affecting the frequency band associated therewith; and recovering the signal in response to the selected representation;

wherein the representations are configured such that quality of a corresponding recovered signal generated from one or more of the representations is a function of the particular number of the representations used to generate the recovered signal.

54. The method of claim 53 wherein the one or more frequency bands comprise a plurality of frequency bands, at least two of the frequency bands being contiguous to each other.

55. The method of claim 53 wherein the information is encoded in accordance with a forward error correction coding technique.

56. The method of claim 55 wherein the measure is a function of a count of detections of errors in the selected representation, in accordance with the forward error correction coding technique.

57. The method of claim 53 wherein the measure is a function of a signal-to-interference ratio afforded by the frequency band associated with the selected representation.

58. The method of claim 53 wherein the selected representation includes an AM version of the signal.

59. The method of claim 58 further comprising demodulating the AM version of the signal.

60. The method of claim 53 wherein one of the frequency bands includes a carrier frequency used for radio broadcast.

61. The method of claim 60 wherein the carrier frequency is an AM carrier frequency.

* * * * *